(12) United States Patent
Bristoll-Groll (10) Patent No.: US 10,973,176 B2
(45) Date of Patent: Apr. 13, 2021

(54) SYSTEMS AND METHODS FOR RAINWATER COLLECTION AND CONTROLLED OUTFLOW

(71) Applicant: Carrie Bristoll-Groll, Cudahy, WI (US)

(72) Inventor: Carrie Bristoll-Groll, Cudahy, WI (US)

( * ) Notice: Subject to any disclaimer, the term of this patent is extended or adjusted under 35 U.S.C. 154(b) by 495 days.

(21) Appl. No.: 15/851,200

(22) Filed: Dec. 21, 2017

(65) Prior Publication Data

US 2018/0371725 A1  Dec. 27, 2018

Related U.S. Application Data

(60) Provisional application No. 62/437,116, filed on Dec. 21, 2016.

(51) Int. Cl.
*E03B 1/04* (2006.01)
*E04D 13/04* (2006.01)
*E04D 13/08* (2006.01)
*A01G 9/02* (2018.01)
*A01G 27/02* (2006.01)

(52) U.S. Cl.
CPC ............... *A01G 9/02* (2013.01); *A01G 27/02* (2013.01); *E04D 13/0409* (2013.01); *E04D 13/0445* (2013.01); *E04D 13/08* (2013.01); *E03B 1/041* (2013.01); *E03B 2001/047* (2013.01); *E04D 2013/045* (2013.01); *E04D 2013/0427* (2013.01); *E04D 2013/0495* (2013.01); *E04D 2013/0853* (2013.01)

(58) Field of Classification Search
CPC ........... A01G 27/00; A01G 27/02; A01G 9/02
See application file for complete search history.

(56) References Cited

U.S. PATENT DOCUMENTS

| 4,077,511 | A | * | 3/1978 | Mosijowsky | A01C 21/00 137/268 |
| 4,528,774 | A | * | 7/1985 | Skaife | A01G 9/02 47/81 |
| 7,470,362 | B2 | * | 12/2008 | Kent | C02F 3/046 210/150 |
| 7,959,799 | B2 | * | 6/2011 | Happel | B01D 21/0012 210/163 |
| 9,027,279 | B2 | * | 5/2015 | Hashimoto | A01G 27/02 47/79 |

(Continued)

*Primary Examiner* — Peter M Poon
*Assistant Examiner* — Marisa V Conlon
(74) *Attorney, Agent, or Firm* — Quarles & Brady LLP (57) ABSTRACT

A rainwater distribution system for storing and distributing rainwater includes a first container configured to store rainwater and having a bottom wall and a side wall; a planting container being elevated off of the bottom wall and within the first container, and having a planting container bottom wall and a side wall; a planting container support configured to elevate the planting container off of the bottom wall and within the first container; a cascade aperture having a cascade filter, the cascade aperture positioned on the side wall of the planting container, and allows the rainwater that enters the planting container to exit the planting container into the first container; and an outlet aperture positioned on the side wall of the first container and configured to allow the rainwater to exit the first container at a controlled rate.

20 Claims, 7 Drawing Sheets

(56) References Cited

U.S. PATENT DOCUMENTS

| | | | | |
|---|---|---|---|---|
| 9,504,208 B2* | 11/2016 | Adolf | .................. | A01G 9/02 |
| 10,118,846 B2* | 11/2018 | Holtz | .................. | C02F 3/046 |
| 10,149,442 B2* | 12/2018 | Hohmann | .............. | A01G 27/02 |
| 10,225,998 B2* | 3/2019 | Wang | .................. | A01G 9/02 |
| 2006/0272211 A1* | 12/2006 | Motelow | .................. | A01G 9/02 47/79 |
| 2007/0084107 A1* | 4/2007 | Ganti | .................. | A01G 9/02 47/39 |

* cited by examiner

SYSTEMS AND METHODS FOR RAINWATER COLLECTION AND CONTROLLED OUTFLOW

CROSS REFERENCE TO RELATED APPLICATIONS

This application claims priority to U.S. Provisional Application No. 62/437,116 filed Dec. 21, 2016, the contents of which are incorporated herein by reference.

STATEMENT OF FEDERALLY SPONSORED RESEARCH OR DEVELOPMENT

Not applicable.

FIELD OF THE INVENTION

The present disclosure relates to rainwater management systems. More particularly, the disclosure relates to systems and methods for rainwater collection and controlled outflow from outdoor structures such as residential housing, commercial buildings, or public buildings and other structures.

BACKGROUND

Rainwater collection systems such as rain gardens and rainwater tanks prevent rainwater runoff from flowing into storm drains and surface waters by providing the fluid an opportunity to soak into the ground or be saved for later use. These systems can improve the overall water quality in nearby bodies of water as more pollutants are contained rather than being transported across impervious surfaces like roofs, compacted lawn areas, and streets. In the case of rainwater tanks, the collected rainwater can be released in a controlled manner or used for various functions, such as watering plants.

Although useful, rainwater collection systems are commonly known to have several deficiencies. Rain gardens often contain only one inlet area, which can lead to uneven distribution of the rainwater to the plants. Both rain gardens and rainwater tanks are only capable of containing a finite water volume and often lack systems to control overflow. Neither rain gardens nor rainwater tanks function appropriately during winter or frozen condition months and are intended to be taken off-line or will freeze solid. Unfortunately, because these systems are often placed near building structures, heavy rains can lead to overflowing rainwater flooding basement structures as well as the overwatering of plants near-to or within the systems. Additionally, because certain paints and roofing materials contain contaminants, airborne pollutants, and bacteria from birds and small mammals (e.g., squirrels, bats), tend to settle on rooftops, these systems, which often lack means of containing this waste, only serve to delay such unwanted chemicals from eventually entering the groundwater. Rainwater tanks may also allow bacteria to grow due to long-term standing and stagnant water contained within the tanks.

Integration of these systems has also been traditionally cumbersome. Conventional rain gardens require some amount of excavation and as do rainwater tanks that are stored underground. When stored above ground, these large tanks often take up space that could be otherwise be used for storage, recreational area activities, or planting gardens. These systems can be large and difficult to initially transport to the site. Also, rainwater tanks in particular often necessitate that additional piping, pumps, and collection mechanisms are added to the existing structure.

While the known rainwater collection systems described above can provide benefits, problems still exist with their mechanical design and operability. Therefore, it is desirable to provide improved systems and methods for rainwater collection and controlled outflow that overcome the deficiencies described above.

BRIEF SUMMARY

The present disclosure provides for systems and methods for rainwater collection and controlled outflow and is known as the StormGUARDen™. The system combines the unique advantages of rain gardens and rainwater tanks while overcoming previous system deficiencies.

In one aspect, the present disclosure provides a rainwater distribution system for storing and distributing rainwater comprising a first container, the first container configured to store rainwater and having a bottom wall and at least one side wall; at least one planting container, the at least one planting container being elevated off of the bottom wall and within the first container, and having a planting container bottom wall and at least one side wall; at least one planting container support, the at least one planting container support configured to elevate the at least one planting container off of the bottom wall and within the first container; at least one cascade aperture, the at least one cascade aperture having a cascade filter, the cascade aperture positioned on the at least one side wall of the at least one planting container, and configured to allow the rainwater that enters the at least one planting container to exit the at least one planting container into the first container; and at least one outlet aperture, the at least one outlet aperture positioned on the at least one side wall of the first container and configured to allow the rainwater to exit the first container at a controlled rate.

The at least one planting container support may comprise at least one of a base, fastener, notch, edge, or legs. The at least one planting container support may comprise a base positioned between the bottom wall and the planting container bottom wall, the base made of a penetrable polymer support network. Both the first container and the at least one planting container may have four walls and an open top. The bottom wall may be formed from a flexible liner that is impermeable to the rainwater and is coupled to or supported by the four walls of the first container, the flexible liner extending generally from the bottom wall to the open top of the first container.

In another aspect, the present disclosure provides a rainwater distribution system for storing and distributing rainwater comprising a first container, the first container configured to contain rainwater and having a bottom wall and at least one side wall; at least one planting container, the at least one planting container being enclosed and elevated within the first container and having a planting container bottom wall and at least one side wall; at least one planting container support, the at least one planting container support comprising a base, the base positioned between the bottom wall and the planting container bottom wall, the at least one planting container support configured to elevate the at least one planting container off of the bottom wall and within the first container; an inlet channel having a length, the inlet channel positioned at least partially above the at least one planting container, the inlet channel configured to distribute the rainwater to the at least one planting container; at least one cascade aperture, the at least one cascade aperture positioned on the at least one side wall of the at least one planting container, and configured to allow the rainwater that enters the at least one planting container to exit the at least one planting container into the first container; at least one cascade filter, the at least one cascade filter configured to prevent select solids from passing through the at least one cascade aperture; and at least one outlet aperture, the at least one outlet aperture positioned on the at least one side wall of the first container and configured to allow the rainwater to exit the first container at a controlled rate.

The at least one cascade filter may cover the at least one cascade aperture. The rainwater distribution system may further comprise a soil layer within the at least one planting container. The rainwater distribution system may further comprise an additional filter layer and a rainwater containment layer located below the soil layer and within the at least one planting container, the additional filter layer positioned above the rainwater containment layer, and the additional filter layer is configured to prevent select solids from passing through the additional filter layer and into the rainwater containment layer. The rainwater distribution system may further comprise one or more plants in the at least one planting container. The inlet channel may extend along a length of the first container and is configured to evenly distribute the rainwater along the length of the inlet channel. The at least one planting container may be modular, removable, and replaceable. The at least one planting container may have at least one of handles, grips, or fasteners to be held when being removed or carried, and includes a liner that is impermeable to the rainwater.

In yet another aspect, the present disclosure provides a rainwater distribution system for storing and distributing rainwater comprising a first container, the first container configured to hold rainwater and having a bottom wall and four side walls; at least one planting container, the at least one planting container being elevated off of the bottom wall and within the first container, and having a planting container bottom wall and four side walls; at least one planting container support, the at least one planting container support configured to elevate the at least one planting container within the first container; an inlet channel positioned at least partially above the at least one planting container, the inlet channel configured to distribute the rainwater to the at least one planting container; at least one cascade aperture, the at least one cascade aperture positioned on the at least one side wall of the at least one planting container, and configured to allow the rainwater that enters the at least one planting container to exit the at least one planting container into the first container; at least one cascade filter, the at least one cascade filter configured to prevent select solids from passing through the at least one cascade aperture; at least one slow-release aperture, the at least one slow-release aperture positioned on one of the four side walls of the first container and is configured to allow the rainwater within the first container to exit the first container at a controlled rate; and an overflow aperture, the overflow aperture positioned on one of the four side walls of the first container at a higher height relative to the at least one slow-release aperture, and configured to allow the rainwater to exit the first container when the rainwater within the first container exceeds a height of the at least one slow-release aperture.

A length of the first container may be about 10 feet long. The at least one cascade aperture may be positioned about 2 inches above the planting container bottom wall. The rainwater distribution system may further comprise a hose bib, plug, or valve connected to at least one of the overflow aperture and the at least one slow-release aperture to control the outlet flow of rainwater from the first container. At least one of the overflow aperture and the at least one slow-release aperture may be threaded. The volume enclosed by the first container minus the volume of the at least one planting container may be about 350 gallons. The rainwater distribution system may further comprise an access panel, the access panel positioned across a portion of a top of the first container and configured to be removable and replaceable.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed there-after and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise specified or limited, phrases similar to "at least one of A, B, and C," "one or more of A, B, and C," and the like, are meant to indicate A, or B, or C, or any combination of A, B, and/or C, including combinations with multiple or single instances of A, B, and/or C.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Furthermore, the disclosed subject matter may be implemented as a system, method, apparatus, or article of manufacture using standard engineering techniques to store and distribute fluids and implement aspects detailed herein.

As used herein, the word "exemplary" is used herein to mean serving as an example, instance, or illustration. Any aspect or design described herein as "exemplary" is not necessarily to be construed as preferred or advantageous over other aspects or designs.

Embodiments of the technology are described below by using diagrams to illustrate either the structure or processing of embodiments used to implement the embodiments of the present technology. Using the diagrams in this manner to present embodiments of the technology should not be construed as limiting of its scope.

Referring generally to FIG. 1-7, in one aspect, the present disclosure provides a rainwater distribution system for storing and distributing rainwater comprising a first container, the first container configured to store rainwater and having a bottom wall and at least one side wall; at least one planting container, the at least one planting container being elevated off of the bottom wall and within the first container, and having a planting container bottom wall and at least one side wall; at least one planting container support, the at least one planting container support configured to elevate the at least one planting container off of the bottom wall and within the first container; at least one cascade aperture, the at least one cascade aperture having a cascade filter, the cascade aperture positioned on the at least one side wall of the at least one planting container, and configured to allow the rainwater that enters the at least one planting container to exit the at least one planting container into the first container; and at least one outlet aperture, the at least one outlet aperture positioned on the at least one side wall of the first container and configured to allow the rainwater to exit the first container at a controlled rate.

The first container of the system of the present disclosure may comprise one, two, three, four, or more side walls, and has an open top. The first container may comprise a generally rigid and/or flexible liner that is impermeable to water, such as a reinforced polyethylene (RPE), or other known materials. A part of the liner may form a bottom wall of the first container. The liner may be coupled to the interior of the at least one side wall of the first container. The liner can extend generally from the bottom wall to the open top of the first container. The liner can serve to protect the interior of the at least one side wall from contact with the rainwater. This protection can expand the types of materials that can be used to construct the first container. The liner may be coupled to or supported by the first container using at least one of fixtures, fasteners, or adhesives. The liner may extend along a vertical length of any side walls. The liner may comprise a flexible, polymeric material. In alternative, exemplary embodiments, the bottom wall may alternatively comprise a solid wall that may not extend along a vertical length of the side walls. The bottom wall may have a circular, semicircular, triangular, quadrilateral, pentagonal, hexagonal, or other similar shape. In an exemplary embodiment, the first container has a rectangular bottom wall formed from a part of the liner and four side walls. The length of the rectangular base may be between 5 and 10 ft., between 8 and 12 ft., or about 10 ft. The first container may be constructed with at least one of a polymeric, metallic, ceramic, or organic material. The first container may be constructed, in part, with wood or a wood composite that may be treated or untreated. The first container may comprise a protective outside cladding material. The first container may comprise interior insulation material. The first container may have an open top. In an exemplary embodiment the first container has dimensions of about 10 ft. long by 3 ft. wide by 2.5 ft. tall with about 2 in. thick walls. The volume enclosed by the first container minus the volume of the one or more planting containers may be about 150, about 200, about 250, about 300, about 350, about 400, about 450, or about 500 gallons.

The one or more planting containers of the system of the present disclosure can be enclosed and elevated within the first container and have a bottom wall and at least one side wall. The planting containers may comprise one, two, three, four, or more side walls and a bottom wall having a circular, semicircular, triangular, quadrilateral, pentagonal, hexagonal, or other similar shape. In an exemplary embodiment, the first container has a rectangular bottom wall with four side walls. The system may comprise 1, 2, 3, 4, 5, 6, 7, 8, 10, 14, 20, or more planting containers. The planting containers may have an open top. The at least one wall may slope outward or inward. The planting containers may be constructed with at least one of a polymeric, metallic, ceramic, or organic material. The bottom wall and at least one side wall of the planting container may be impermeable to water. The one or more planting containers may include a planting container liner that is impermeable to water. The one or more planting containers may be modular, removable, and/or replaceable. The one or more planting containers may have at least one of handles, grips, or fasteners to be held when being removed or carried. The one or more planting containers may have an internal volume of about 0.5, 1, 2, 3, 4, 5, 10, 20, 27, 30, 40, 50, or 100 gallons, for example.

A soil layer may be located within the one or more planting containers. The soil layer may be used to contain water and to provide nutrients to one or more plants in the one or more planting containers. The one or more plants grown in the planting containers may be crops, flowers, or other common small plants. The soil composition may be tailored to the specific plants being grown or the expected inlet flowrate of rainwater into the system. For example, if low inlet flowrates of rainwater are expected, the soil materials chosen may be more absorbent. Within each planting container, there may be at least one additional rainwater containment layer located below the soil layer and within the one or more planting containers. These additional rainwater containment layers may comprise objects sized or shaped to store more rainwater than the soil layer. For example, the objects may be porous, of large volume, or have a small packing factor. The particles may be stone or wood chips, as non-limiting examples. An additional filter layer may be positioned above the additional rainwater containment layers and configured to prevent select solids from passing through it. The additional filter layer may comprise smaller objects than the objects present in the additional rainwater containment layers. In one exemplary embodiment, the additional filter layer comprises pea gravel that is at least partially overlaid with a filter fabric. At least one of the additional rainwater containment layers may be positioned to a height that allows it to substantially contact the at least one cascade aperture to allow the rainwater to flow out of the cascade aperture.

The at least one planting container support of the system of the present disclosure can be configured to elevate the one or more planting containers within the first container. The planting container support may comprise a base or legs, for example. If a base, the base may be a mostly hollow or porous shape. For example, the base may be made of a penetrable polymer support network. This penetrable polymer support network may be a mesh structure capable of being assembled from multiple components. If a base, the base may reduce the need for lateral support of the one or more planting containers. The planting container support may comprise a fastener, notch, or edge, for example. In one exemplary embodiment, the planting container support may comprise one or more protruding notches on the one or more planting containers, the notches being configured to rest on or couple to, and provide support from, one or more protruding edges or lips of the first container. The planting container support may comprise multiple support components working together to provide the elevation and support of the one or more planting containers.

The inlet channel of the system of the present disclosure can be configured to distribute the rainwater to the one or more planting containers. More than one inlet channel can be included. The inlet channel may be a tube, an extended container such as a trough, a chute, or another component capable of transporting rainwater. The inlet channel may contain apertures, slits, an open top, or any combination thereof, from which rainwater can flow from the inlet channel into the one or more planting containers. The inlet channel may be positioned above the one or more planting containers. The inlet channel may be configured to evenly distribute rainwater to the one or more planting containers. The inlet channel may be adjusted to be approximately level to cause rainwater to overflow evenly. The inlet channel may contain items to reduce the velocity of rainwater within it or entering it. For example the inlet channel may contain ridges or objects such as stones. In an exemplary embodiment, the inlet channel is an extended container that extends generally horizontally from the side wall of first container that is opposite the at least one outlet aperture to the farthest side wall of any planting container, wherein the inlet channel can be generally above the center of each planting container. Alternatively, the inlet channel may be positioned along the length of the planting containers between a side wall of the first container and the planting containers, and the inlet channel can be tilted in the direction of the planting containers. In both these embodiments, inlet rainwater may eventually fill the inlet channel and overflow into the planting containers.

The at least one cascade aperture of the system of the present disclosure can be positioned on the at least one side wall of the one or more planting containers and can be configured to allow the rainwater that enters the one or more planting containers to exit the one or more planting containers into the first container. The cascade aperture may be any common shape. The area of the cascade aperture may be chosen based on the expected flowrate of the rainwater entering the rainwater distribution system. For example, the cascade aperture area may have a positive correlation with the expected rainwater flowrate. The outlet flowrate from the cascade aperture may be adjusted using a plug or valve, for example. The at least one cascade aperture may have an area between 0.5 and 30 in.$^2$, between 5 and 20 in.$^2$, or between 10 and 15 in.$^2$. The height of the cascade aperture may be chosen based on how much rainwater retention is desired in the one or more planting containers. The height from the bottom wall of the one or more planting containers to the bottom of the cascade aperture may be about 0.5, 1, 1.5, 2, 2.5, 3, 4, 5, 6, 7, 8, 10 in., or more. There may be additional cascade apertures present on at least one side wall of the one or more planting containers. These additional cascade apertures may be located at different heights along the at least one side wall and may have different aperture areas in order to control the flowrate of rainwater leaving the one or more planting containers with respect to the volume of rainwater present within the containers. In an exemplary embodiment, each cascade aperture is a 4 in. diameter round hole placed on the at least one side of the planting container that is closest to the at least one outlet aperture. In this exemplary embodiment, the bottom of the cascade aperture can be located about 2 in. above the bottom wall of the planting container.

The at least one cascade filter of the system of the present disclosure can be configured to prevent select solids from passing through the at least one cascade aperture. Each cascade filter may be placed directly over each cascade aperture on either the inside or outside wall of the planting container. The cascade filter may be made of a polymeric, metallic, ceramic, or organic material, for example. The cascade filter may be a fabric, mesh, screen, or semipermeable layer, for example. The cascade filter fabric may be a stainless steel or aluminum screen. The cascade filter may comprise a semipermeable layer of small particles such as sand or pebbles captured between two pervious layers. The cascade filter may comprise activated carbon. The select solids prevented from passing through the cascade filter may be particles or items above a certain size. For example, dirt or sand may be the select solids prevented from passing through the cascade filter. The cascade filter may prevent all select solids from passing through it or only a portion of the select solids.

The at least one outlet aperture of the system of the present disclosure can be positioned on the at least one side wall of the first container and can be configured to allow the rainwater to exit the first container. The liner can be sealed to the first container wall at the at least one outlet aperture with a watertight fitting. The at least one outlet aperture may be any common shape. The area of the at least one outlet aperture may be chosen based on the expected flowrate of the rainwater entering the rainwater distribution system. For example, the at least one outlet aperture area may have a positive correlation with the expected rainwater flowrate. The at least one at least one outlet aperture may have an area between 0.5 and 30 in.$^2$, between 2 and 10 in.$^2$, or between 3 and 5 in.$^2$. The height of the at least one outlet aperture may be chosen based on how much rainwater retention is desired in the bottom of the first container. The height from the bottom wall of the one or more planting containers to the bottom of the at least one outlet aperture may be less than 0.5, 1, 1.5, 2, 2.5, 3, 4, 5, 6, 7, 8, 10, 12, 16, 20, 30, 40, 50 in., or more. There may be multiple outlet apertures present on the at least one side wall of the first container. These multiple outlet apertures may be located at different heights along the at least one side wall, or other side walls, and may have different aperture areas in order to control the flowrate of rainwater leaving the first container with respect to the volume of rainwater present within the container. In an exemplary embodiment, there are multiple outlet apertures: there can be at least one overflow aperture and at least one slow-release aperture. The overflow aperture may be an approximately 2 in. diameter round hole placed on the at least one side of the first container that is farthest away from the area where rainwater enters the inlet channel. In this exemplary embodiment, the bottom of the overflow aperture may be located 12 in. above the bottom wall of the first container. The at least one slow-release aperture may be located at a lower height than the overflow aperture and have a smaller area relative to the overflow aperture. In other exemplary embodiments, there may be more than one slow-release apertures positioned at progressively lower heights and with smaller areas relative to the overflow aperture. Any outlet aperture may be threaded or shaped to connect to a hose, hose bib, plug, or valve configured to control either the flowrate or the final destination of the rainwater flowing out of the outlet aperture.

The rainwater distribution system may also comprise an access panel. The access panel may be placed across the top of the first container near the side wall on which the at least one outlet aperture is located. The access panel may extend along a portion of or the full length of this particular side wall and contact additional side walls. The access panel may be supported by one or more interior extruding edges of the first container. The access panel may be sized to leave a high-flow bypass aperture between the access panel and the closest planting container. Alternatively, if there is no access panel present, any space between the closest planting container and the side wall containing the at least one outlet aperture may be considered a high-flow bypass aperture. In some embodiments, the high-flow bypass aperture may include any area across the top of the first container in which there is not a planting container present directly below. The access panel may have a window or screen. The window or screen may be used to view the internal state within the first container. The access panel may have handles, grips, or fasteners to be held when being removed or carried. The access panel may function as an access point to provide maintenance to the interior of the first container and observation to operation of the cascade aperture of the end-most planting container.

In another aspect, the present disclosure provides a method for collecting and utilizing rainwater runoff from an outdoor structure using the above rainwater distribution system. The method may comprise arranging the rainwater distribution system near an outdoor structure having a downspout, wherein the outdoor structure is configured to collect and divert rainwater into the inlet channel; storing the rainwater; and releasing the rainwater.

In this method, arranging the rainwater distribution system may include placing the rainwater distribution system on a downward slope relative to the outdoor structure and positioning the at least one outlet aperture away from the outdoor structure. The slope of the ground supporting the rainwater distribution system may need to be initially adjusted from its previous state. The slope percentage of the downward slope may be at least 1%, 2%, 3%, 4%, or more, or less. Arranging the rainwater distribution system may include creating a level gravel base for the rainwater distribution system to rest on. The downspout from the outdoor structure may also need to be adjusted as part of the arranging step. For example, if the outdoor structure is a residential home, the downspout may be adjusted so that its outlet flow of rainwater enters the inlet channel of the rainwater distribution system. The outdoor structure may be selected from a variety of structures exposed to rainfall including either residential and commercial buildings as well as natural structures or pathways. Arranging the rainwater distribution system may include assembling the system from individual parts. When assembling the system, the first container may be shipped and assembled from parts smaller than 22 in. by 30 in. by 34 in. The planting containers, hardware, liner and other parts may be shipped and assembled from parts smaller than 22 in. by 26 in. by 32 in.

In this method, the step of storing and releasing the rainwater may be accomplished naturally through the use of gravity and an inlet flowrate of rainwater into the inlet channel. In an exemplary embodiment, rainwater is collected by the outdoor structure and diverted into the inlet channel. In some embodiments, once the rainwater has filled the inlet channel, the rainwater then overflows over at least one wall of the inlet channel into the one or more planting containers. A portion of the rainwater may be retained in the one or more planting containers below the cascade aperture and within the soil. As the level of rainwater in each planting container increases, the rainwater may then flow through the at least one cascade filter and at least one cascade aperture. If there is a high inlet flowrate of rainwater, the planting containers may overflow rainwater directly into the first container. Rainwater in the first container may automatically exit through an outlet aperture such as through a slow-release aperture. Once rainwater in the first container reaches a certain height, it may exit through an additional outlet aperture, such as an overflow aperture. To retain rainwater in the first container long-term, one or more plugs, valves, or spigots for example may be placed into any outlet aperture.

Turning more specifically to the figures, the following description and drawing figures pertain to embodiments of the invention directed to systems and methods for rainwater collection and controlled outflow as described above.

Figure 1:
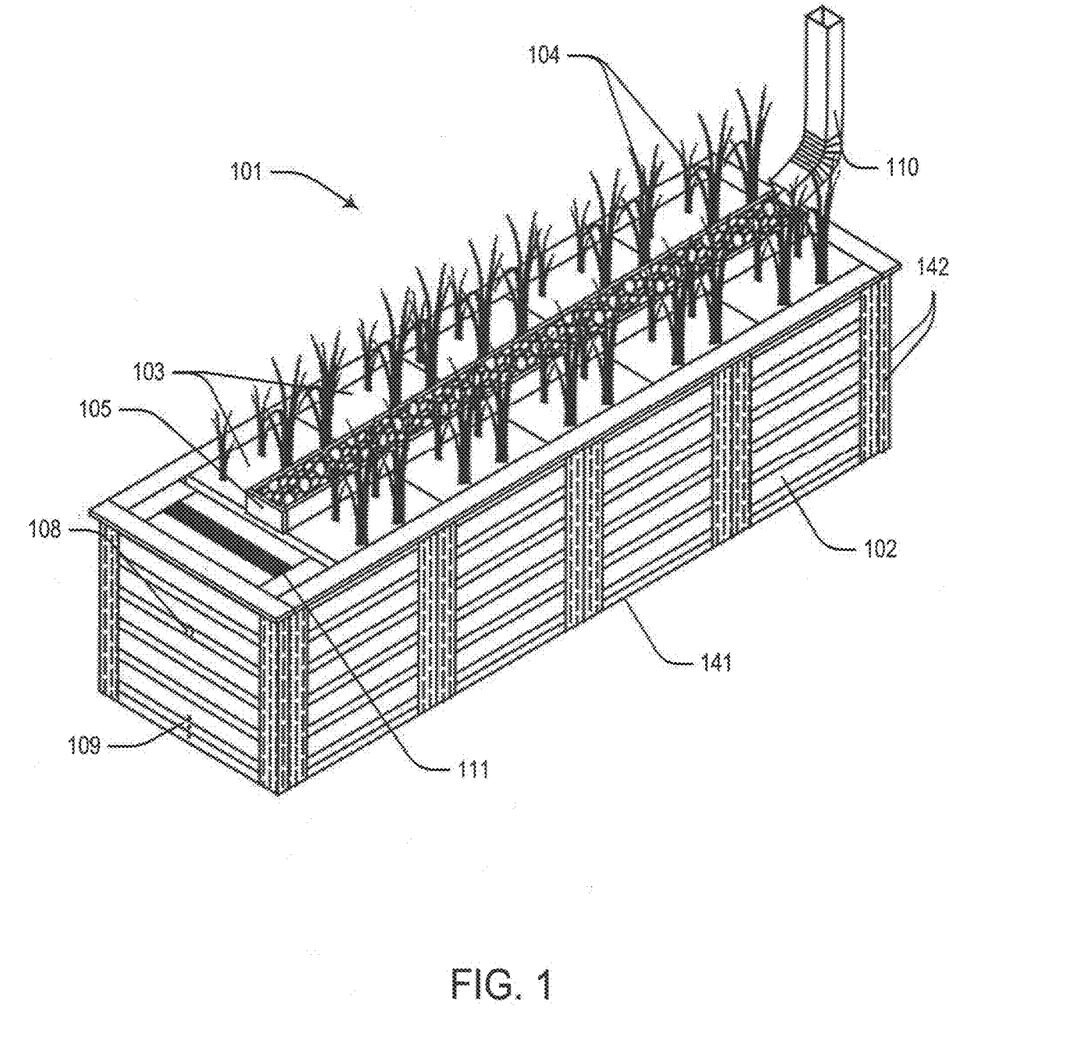
FIG. 1 is an isometric view of an exemplary rainwater distribution system according to embodiments of the present disclosure.

As seen in FIG. 1, a first embodiment of a rainwater distribution system for storing and distributing rainwater is shown. In this embodiment, the rainwater distribution system 101 contains a first container 102 with a rectangular bottom wall 141 and four side walls 142. Enclosed and elevated within the first container 102 are five planting containers 103. In this embodiment, plants 104 are present within each planting container. Elevated above the planting containers is an inlet channel 105, which can be generally centered along the length of the planting containers. The first container 102 comprises an overflow aperture 108 and three slow-release apertures 109. An access screen 111 extends across the top of the first container near the overflow aperture. A downspout 110 extending from an outdoor structure 615 (see FIG. 6) is located above the inlet channel 105 near one of the four side walls 142 that is the furthest side wall from the overflow aperture 108.

Figure 2:
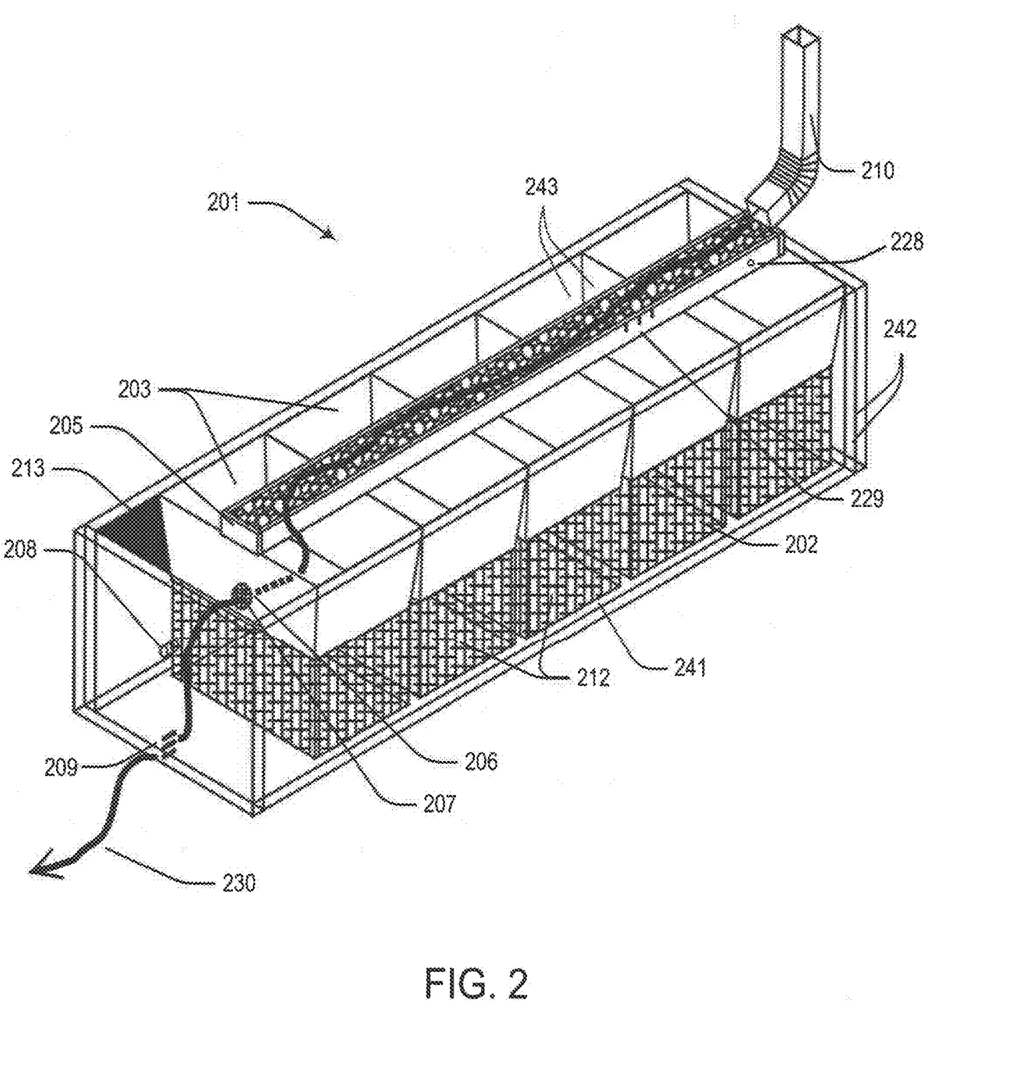
FIG. 2 is an isometric view of a further exemplary rainwater distribution system according to embodiments of the present disclosure. For internal viewing purposes, the outside walls have been depicted as transparent.

As seen in FIG. 2, a further embodiment of the rainwater distribution system 201 is shown. For internal viewing purposes, the side walls 242 of the first container 202 have been depicted as transparent and the access screen 111 and plants 104 are not shown. Similar to FIG. 1, the rainwater distribution system 201 again comprises the elements of a first container 202 with a bottom wall 241 and four side walls 242, five planting containers 203, an inlet channel 205, an overflow aperture 208, and three slow-release apertures 209. The downspout 210 from an outdoor structure 615 (see FIG. 6) is again shown for reference. Elements not previously shown in FIG. 1 include a cascade aperture 206 which is present on one of the four planting container side walls 243 of the planting container nearest the overflow aperture. Extending across this cascade aperture is a cascade filter 207. Each of the five planting containers can contain a similar cascade aperture 206 and cascade filter 207, which are not visible. The inlet channel has an aperture 228 and three slots 229. An additional element that was not previously visible are the five planting container supports 212 which elevate the five planting containers 203. Another element not previously visible is the liner 213 coupled to or supported by the interior of the first container 202. The bottom wall 241 is comprised of part of the liner 213. An exemplary rainwater flow pathway through the rainwater distribution system 201 is shown by arrow 230.

Figure 3:
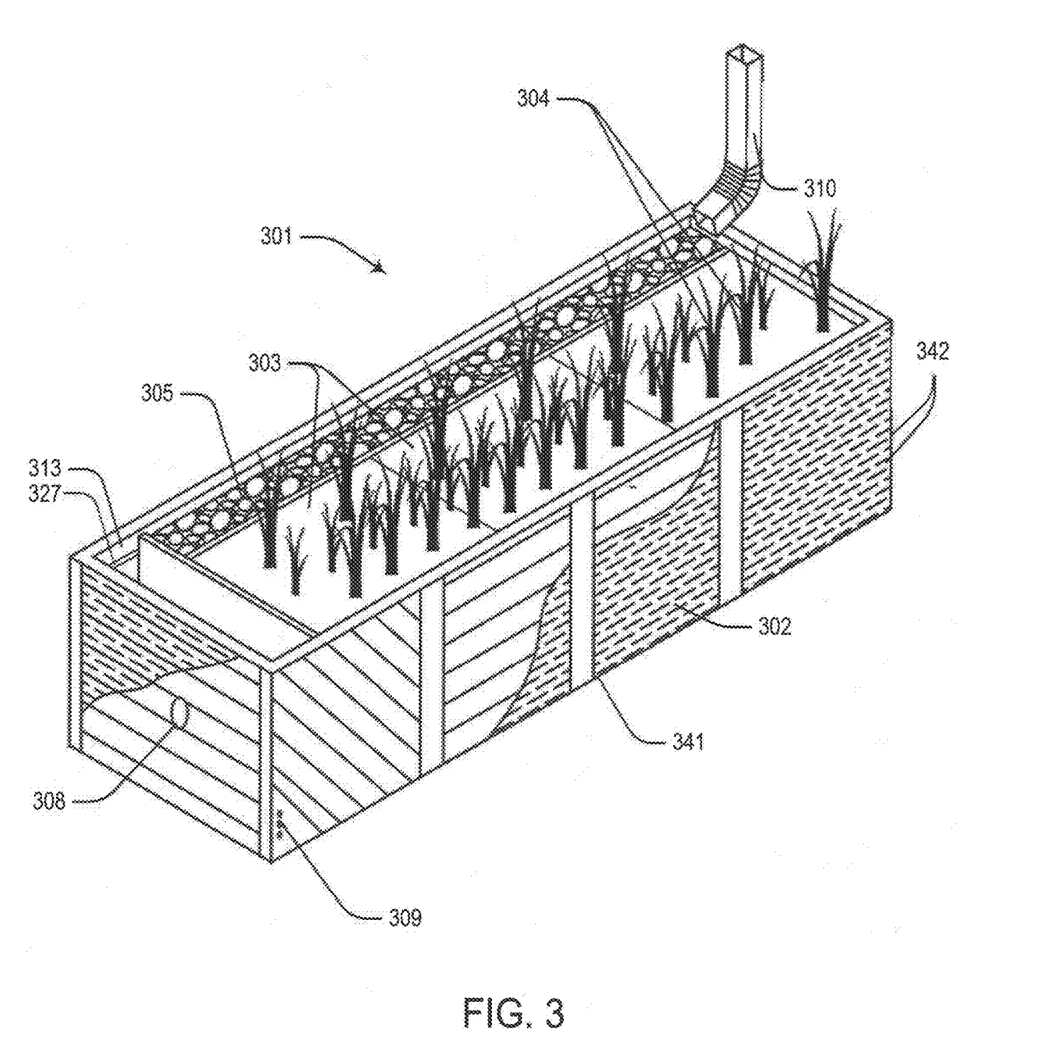
FIG. 3 is an isometric view of a further exemplary rainwater distribution system according to embodiments of the present disclosure.

As seen in FIG. 3, a further embodiment of the rainwater distribution system 301 is shown. In this embodiment, the rainwater distribution system 301 contains a first container 302 with a rectangular bottom wall 341 and four side walls 342. Enclosed and elevated within the first container 302 are three planting containers 303. In this embodiment, plants 304 are present within each planting container. Elevated near the planting containers is an inlet channel 305 which is positioned along the length of the planting containers 303 and between one of the four side walls 342 and the planting containers 303. The first container 302 comprises an overflow aperture 308 and three slow-release apertures 309 positioned on separate walls of the four side walls 342. A liner 313 is coupled to or supported by the interior walls of the first container 302. The bottom wall 341 is comprised of part of the liner 313. A downspout 310 extending from an outdoor structure 615 (see FIG. 6) is located above the inlet channel 305 near the furthest side wall from the overflow aperture 308. The first container 302 contains an inner lip 327 configured to support the planting containers 303.

Figure 4:
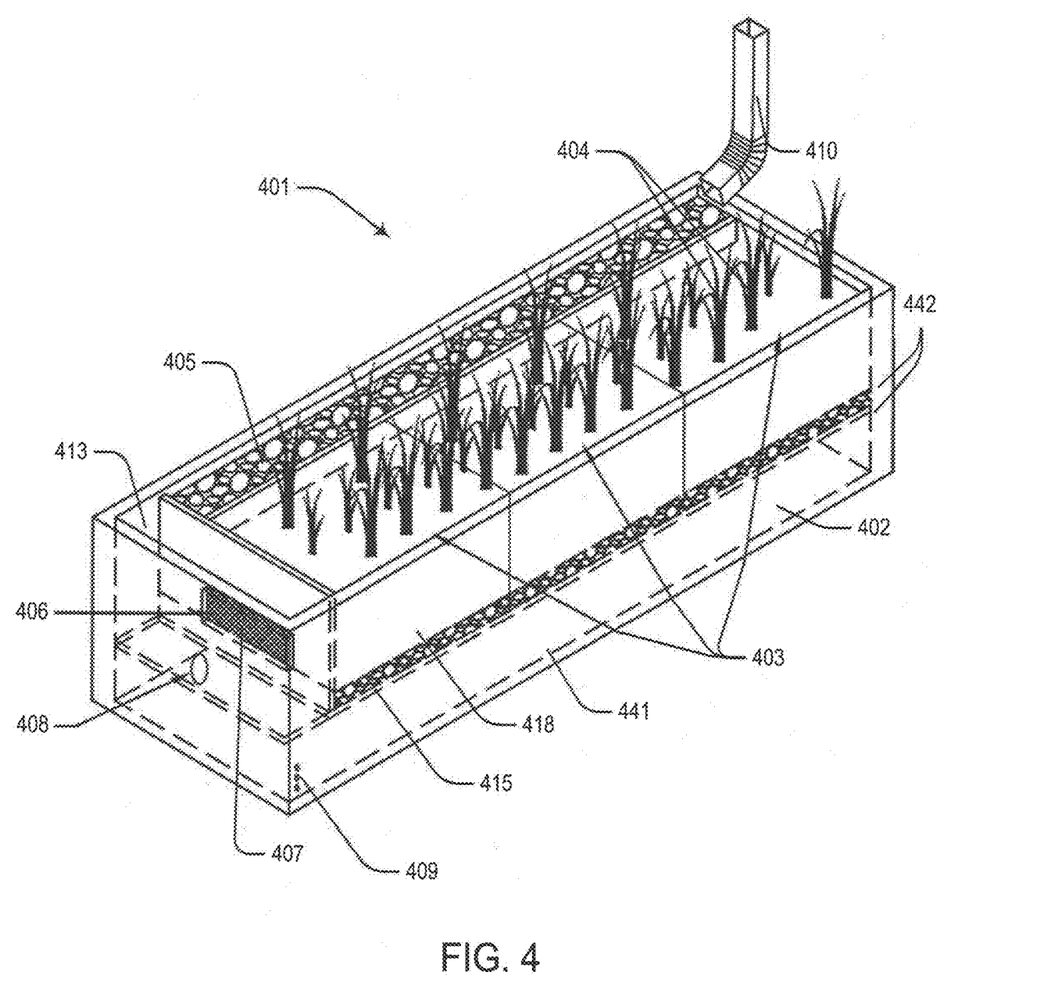
FIG. 4 is an isometric view of a further exemplary rainwater distribution system according to embodiments of the present disclosure. For internal viewing purposes, the outside walls have been depicted as transparent.

As seen in FIG. 4, a further embodiment of the rainwater distribution system 201 is shown. For internal viewing purposes, the four side walls 442 of the first container 402 and the planting containers 403 have been depicted as transparent and the planting container supports are not shown. Similar to FIG. 3, the rainwater distribution system 401 again comprises the elements of a first container 402 with a bottom wall 441 and four side walls 442, three planting containers 403, plants 404, an inlet channel 405, an overflow aperture 408, a liner 413, and three slow-release apertures 409. The bottom wall 441 is comprised of part of the liner 413. The downspout 410 from an outdoor structure 615 (see FIG. 6) is again shown for reference. Elements not previously visible include the cascade aperture 406 which is present on a side wall of the planting container nearest the overflow aperture. Extending across this cascade aperture is a cascade filter 407. Each of the three planting containers can contain a similar cascade aperture 406 and cascade filter 407, which are not visible. In this illustration, an additional element that was not previously visible are the soil layers 418 and the rainwater containment layers 415 present within each planting container 403.

Figure 5A:
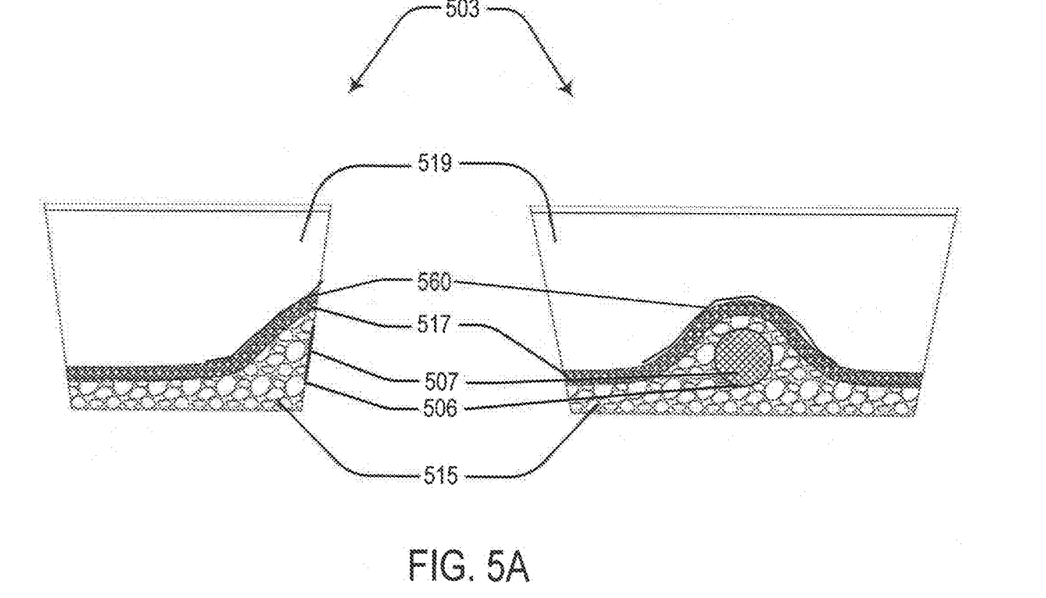
FIG. 5A is a side view (left) and front view (right) of an exemplary planting container according to embodiments of the present disclosure. For internal viewing purposes, the outside walls have been depicted as transparent.

Referring to FIG. 5A, an exemplary embodiment of a planting container 503 is shown from a side view (left) and a front view (right). The planting container 503 contains a soil layer 519 present on top of an intermediate layer 517 which is above a rainwater containment layer 515. In this embodiment, the intermediate layer 517 is a layer of pebbles 517 partially covered with a filter fabric, such as a geotextile layer 560, that work together to comprise an additional filter. A cascade aperture 506 is located on the front side wall of the planting container. Extending across this cascade aperture is a cascade filter 507.

Figure 5B:
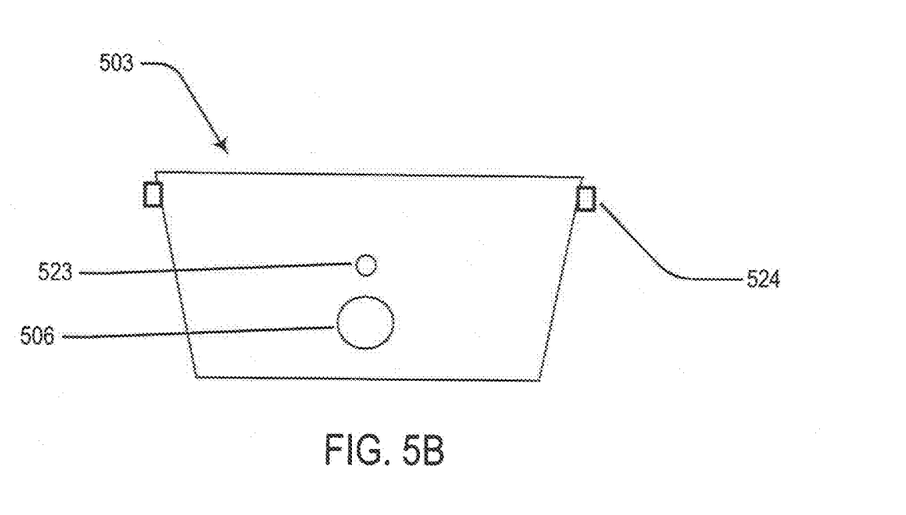
FIG. 5B is a front view (right) of an exemplary planting container according to embodiments of the present disclosure. For viewing purposes, some components such as the cascade filter have been omitted.

Referring to FIG. 5B, a further exemplary embodiment of a planting container 503 is shown from a front view. The planting container contains a cascade aperture 506 and an additional cascade aperture 523. The additional aperture 523 is placed at a higher location and has a smaller aperture area when compared to the cascade aperture 506. The planting container also comprises two handles 524.

Figure 6:
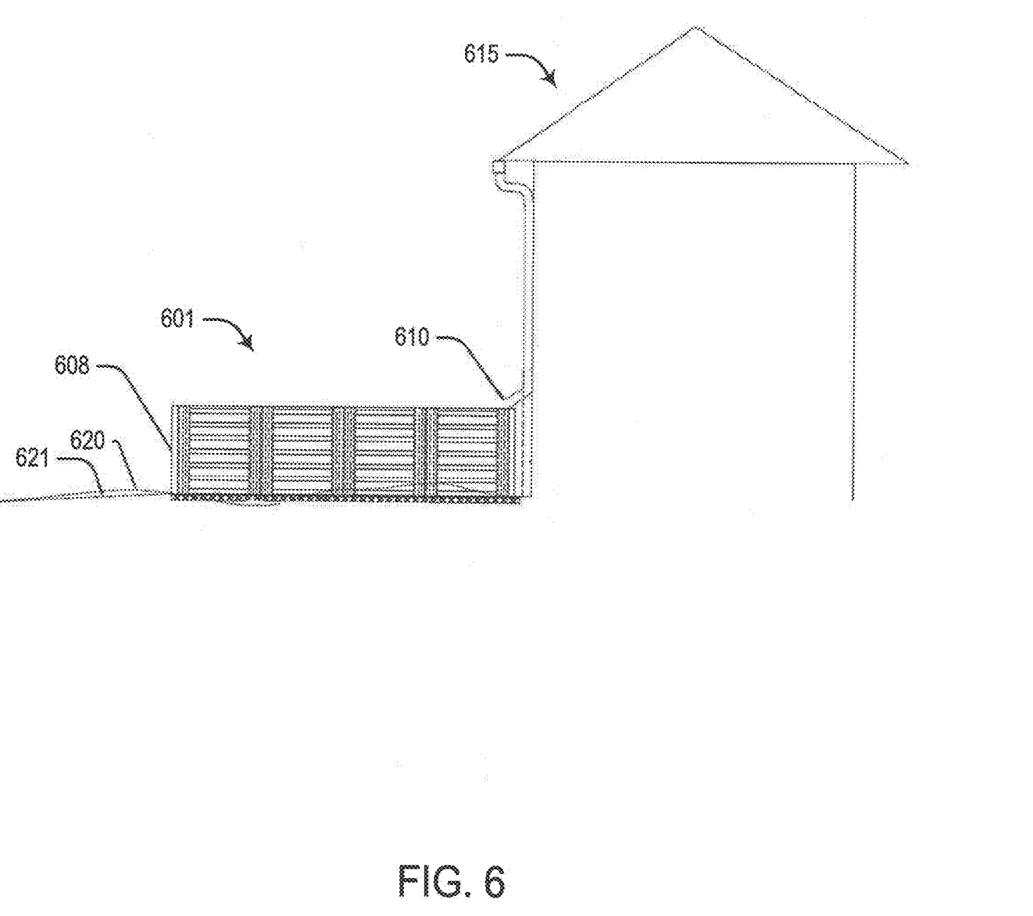
FIG. 6 is a side view of an exemplary rainwater distribution system according to embodiments of the present disclosure. Also depicted is an outdoor structure as well as a landscape before and after installation of the system.

As seen in FIG. 6, a side view of an embodiment of the present disclosure is shown. The rainwater distribution system 601 is shown positioned adjacent to an outdoor structure 615 with the overflow aperture 608 located opposite the outdoor structure. The outdoor structure contains a downspout 610. FIG. 6 depicts an existing ground configuration 620 from a previous time period as well as a new ground configuration 621 after a modification and installation of the rainwater distribution system 601.

Figure 7:
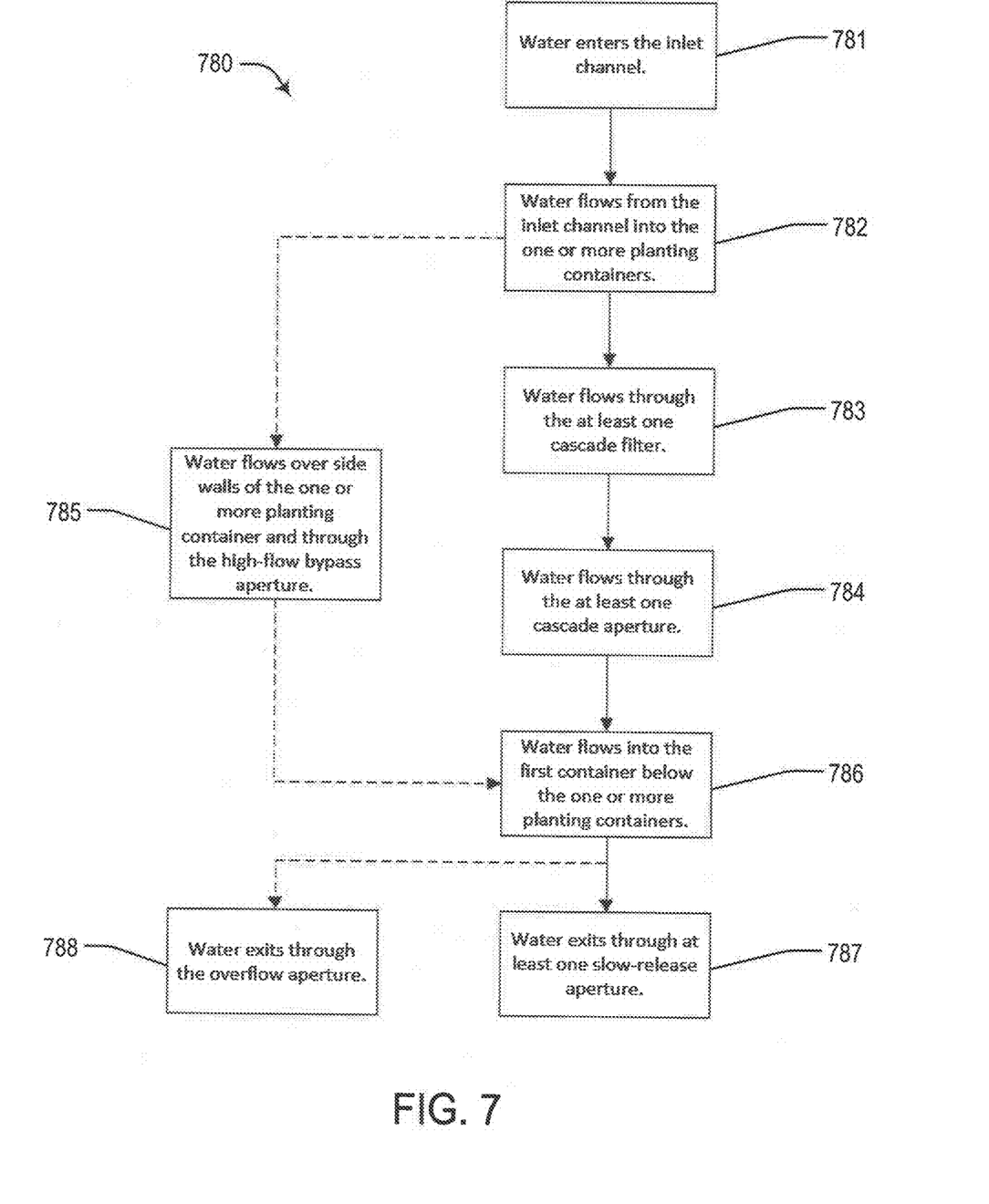
FIG. 7 is a box flow diagram depicting possible rainwater flow pathways within an exemplary embodiment of the rainwater distribution system of the present disclosure.

FIG. 7 shows a box flow diagram 780 depicting possible rainwater flow pathways within an exemplary system of the present disclosure. The diagram depicts exemplary pathways that rainwater may be take when flowing through the rainwater distribution system of the present disclosure. The dotted arrows represent pathways that may be available when high inlet flowrates of rainwater are present. Water, such as rainwater, enters the inlet channel at block 781. Water flows from the inlet channel into the one or more planting containers at block 782. Water flows through the at least one cascade filter at block 783 and through the at least one cascade aperture at block 784. Water then flows into the first container below the one or more planting containers at block 786. When there are high inlet flowrates of rainwater, the rainwater can also flow over the side walls of the one or more plantings containers and directly into the first container or the rainwater can flow through the high-flow bypass aperture at block 785. Water exits through at least one slow-release aperture at block 787. And when the height of rainwater in the first container reaches the height of the overflow aperture, the water can exit through the overflow aperture at block 788.

The foregoing description was primarily directed to embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not be limited by the above disclosure.

What is claimed is:

1. A rainwater distribution system for storing and distributing rainwater, the system comprising:
   a first container, the first container configured to store rainwater and having a bottom wall and at least one side wall;

at least one planting container, the at least one planting container being elevated off of the bottom wall and within the first container, and having a planting container bottom wall and at least one side wall;

at least one planting container support, the at least one planting container support configured to elevate the at least one planting container off of the bottom wall and within the first container;

an inlet channel having a length, the inlet channel positioned at least partially above the at least one planting container, wherein the inlet channel is an extended container having an open top configured to distribute the rainwater by filling and overflowing into the at least one planting container;

at least one cascade aperture, the at least one cascade aperture having a cascade filter, the cascade aperture positioned on the at least one side wall of the at least one planting container, and configured to allow the rainwater that enters the at least one planting container to exit the at least one planting container into the first container; and at least one overflow outlet aperture and at least one slow-release aperture, the at least one overflow outlet aperture and the at least one slow-release aperture positioned at different heights on the at least one side wall of the first container and configured to allow the rainwater to exit the first container at different controlled rates.

2. The rainwater distribution system of claim 1, wherein the at least one planting container support comprises at least one of a base, fastener, notch, edge, or legs.

3. The rainwater distribution system of claim 1, wherein the at least one planting container support comprises a base positioned between the bottom wall and the planting container bottom wall, the base made of a penetrable polymer support network.

4. The rainwater distribution system of claim 1, wherein both the first container and the at least one planting container have four walls and an open top.

5. The rainwater distribution system of claim 4, wherein the bottom wall of the first container is formed from a flexible liner that is impermeable to the rainwater and is coupled to or supported by the four walls of the first container, the flexible liner extending generally from the bottom wall to the open top of the first container.

6. A rainwater distribution system for storing and distributing rainwater, the system comprising:

a first container, the first container configured to contain rainwater and having a bottom wall and at least one side wall;

at least one planting container, the at least one planting container being enclosed and elevated within the first container and having a planting container bottom wall and at least one side wall;

at least one planting container support, the at least one planting container support comprising a base, the base positioned between the bottom wall and the planting container bottom wall, the at least one planting container support configured to elevate the at least one planting container off of the bottom wall and within the first container;

an inlet channel having a length, the inlet channel positioned at least partially above the at least one planting container, wherein the inlet channel is an extended container having an open top configured to distribute the rainwater by filling and overflowing into the at least one planting container;

at least one cascade aperture, the at least one cascade aperture positioned on the at least one side wall of the at least one planting container, and configured to allow the rainwater that enters the at least one planting container to exit the at least one planting container into the first container;

at least one cascade filter, the at least one cascade filter configured to prevent dirt or sand from passing through the at least one cascade aperture; and at least one outlet aperture, the at least one outlet aperture positioned on the at least one side wall of the first container and configured to allow the rainwater to exit the first container at a controlled rate.

7. The rainwater distribution system of claim 6, wherein the at least one cascade filter covers the at least one cascade aperture.

8. The rainwater distribution system of claim 6, further comprising a soil layer within the at least one planting container.

9. The rainwater distribution system of claim 8, further comprising an additional filter layer and a rainwater containment layer located below the soil layer and within the at least one planting container, the additional filter layer positioned above the rainwater containment layer, and the additional filter layer is configured to prevent dirt or sand from passing through the additional filter layer and into the rainwater containment layer.

10. The rainwater distribution system of claim 9, further comprising one or more plants in the at least one planting container.

11. The rainwater distribution system of claim 6, wherein the inlet channel extends along a length of the first container and is configured to evenly distribute the rainwater along the length of the inlet channel.

12. The rainwater distribution system of claim 6, wherein the at least one planting container is modular, removable, and replaceable.

13. The rainwater distribution system of claim 12, wherein the at least one planting container has at least one of handles, grips, or fasteners to be held when being removed or carried, and includes a liner that is impermeable to the rainwater.

14. A rainwater distribution system for storing and distributing rainwater, the system comprising:

a first container, the first container configured to hold rainwater and having a bottom wall and four side walls;

at least one planting container, the at least one planting container being elevated off of the bottom wall and within the first container, and having a planting container bottom wall and four side walls;

at least one planting container support, the at least one planting container support configured to elevate the at least one planting container within the first container;

an inlet channel positioned at least partially above the at least one planting container, wherein the inlet channel is an extended container having an open top configured to distribute the rainwater by filling and overflowing into the at least one planting container, and wherein the inlet channel is configured to receive the rainwater from a downspout of an outdoor structure;

at least one cascade aperture, the at least one cascade aperture positioned on the at least one side wall of the at least one planting container, and configured to allow the rainwater that enters the at least one planting container to exit the at least one planting container into the first container;

at least one cascade filter, the at least one cascade filter configured to prevent dirt or sand from passing through the at least one cascade aperture;

at least one slow-release aperture, the at least one slow-release aperture positioned on one of the four side walls of the first container and is configured to allow the rainwater within the first container to exit the first container at a controlled rate; and an overflow aperture, the overflow aperture positioned on one of the four side walls of the first container at a higher height relative to the at least one slow-release aperture, and configured to allow the rainwater to exit the first container when the rainwater within the first container exceeds a height of the at least one slow-release aperture.

15. The rainwater distribution system of claim 14, wherein a length of the first container is about 10 feet long.

16. The rainwater distribution system of claim 14, wherein the at least one cascade aperture is positioned about 2 inches above the planting container bottom wall.

17. The rainwater distribution system of claim 14, further comprising a hose bib, plug, or valve connected to at least one of the overflow aperture and the at least one slow-release aperture to control the outlet flow of rainwater from the first container.

18. The rainwater distribution system of claim 14, wherein at least one of the overflow aperture and the at least one slow-release aperture are threaded.

19. The rainwater distribution system of claim 14, wherein the volume enclosed by the first container minus the volume of the at least one planting container is about 350 gallons.

20. The rainwater distribution system of claim 14, further comprising an access panel, the access panel positioned across a portion of a top of the first container and configured to be removable and replaceable.

\* \* \* \* \*